Dec. 15, 1925.
A. T. K. ESTELLE
1,565,353
TREATMENT OF IRON SULPHIDE ORES CONTAINING OTHER METALS
Filed June 15, 1925
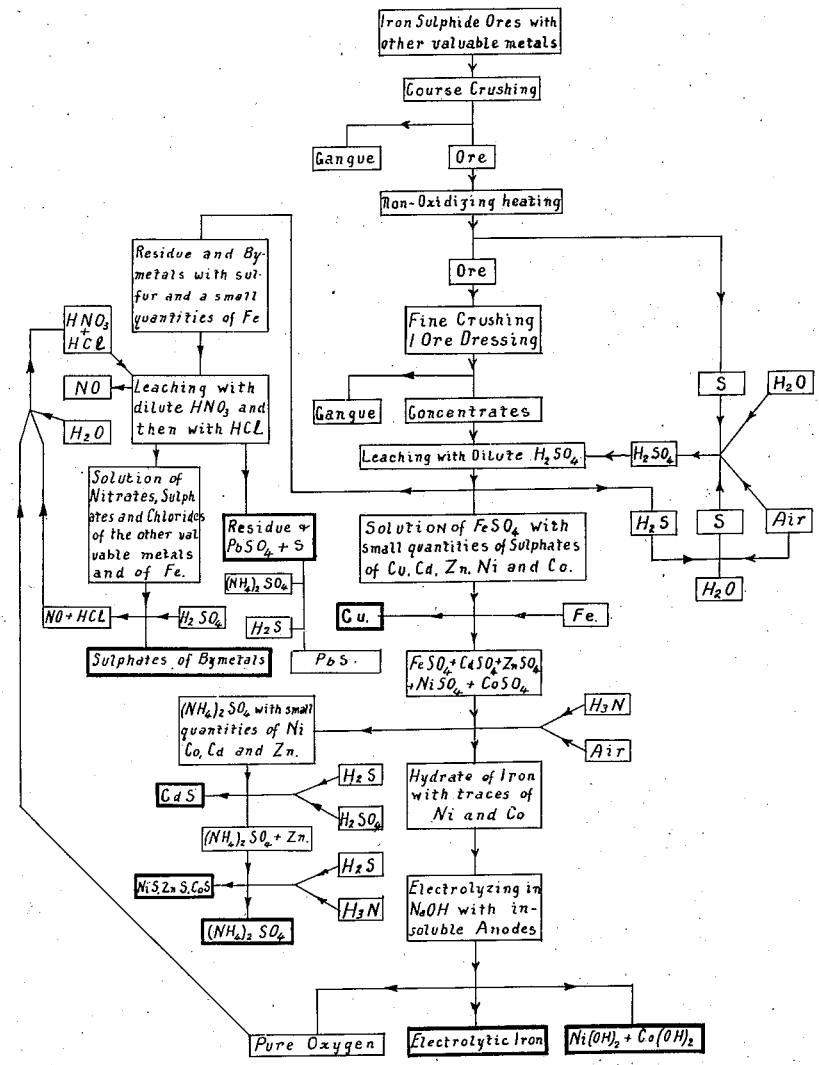
INVENTOR.
AXEL TEODOR KONSTANTIN ESTELLE.
By
ATTORNEY.

Patented Dec. 15, 1925.

1,565,353

UNITED STATES PATENT OFFICE.

AXEL TEODOR KONSTANTIN ESTELLE, OF HAGEN, GERMANY.

TREATMENT OF IRON SULPHIDE ORES CONTAINING OTHER METALS.

Application filed June 15, 1925. Serial No. 37,394.

*To all whom it may concern:*

Be it known that I, AXEL TEODOR KONSTANTIN ESTELLE, a subject of the King of Sweden, residing at the town of Hagen, in Westphalia, in the Republic of Germany, have invented new and useful Improvements in the Treatment of Iron Sulphide Ores Containing Other Metals, of which the following is a specification.

This invention relates to metallurgical processes and more particularly to the treatment of iron sulphide ores containing other valuable metals.

The object of this invention is to provide a process whereby not only the iron and other accompanying metals are recovered but also the sulphur is made of value.

A further object is to provide a cyclic process whereby the acids employed are regenerated.

A further object is to provide a process whereby the valuable constituents of the ores are separated and made available by more thorough and economical methods than hitherto was possible.

In describing the various steps of the process, reference will be made to the accompanying flow sheet to illustrate the sequence and connection of the various steps thereof.

The ore is first crushed and dressed to remove the gangue. The treated ore is then heated in a nonoxidizing manner whereby the complex iron sulphur compounds are reduced to simple sulphides and the excess of sulphur is eliminated and utilized. This volatilized sulphur may be condensed and recovered for separate use or may be employed in the formation of sulphuric acid to be used in the process hereinafter set forth.

The ore is then cooled and finely comminuted. Concentration may then take place in any suitable manner.

The concentrates are then leached in a closed vessel with dilute sulphuric acid with the application of heat.

The sulphureted hydrogen given off is used the recovery of the sulphur, to generate the sulphuric acid and for a precipitating agent as set forth below.

The solution from the leaching vat is then defecated and eventually filtered.

If copper is present, it is then precipitated, preferably with electrolytic iron in order not to make the solution impure and thus to obtain the purest possible electrolytic iron.

After the removal of the copper the solution is evaporated to about 1.4 specific gravity and the iron sulphate is crystallized out and dried in a centrifugal to free it as much as possible from the mother liquor.

The mass of nearly dry crystallized iron sulphate is then exposed in suitable vessels to the action of a mixture of ammonia vapour and air in counter currents. This results in a partial oxidation of the iron and a transposition takes place with the formation of ammonium sulphate and hydrated iron oxides.

The product thus obtained is dried at about 100° C. in order to make the iron hydrate not colloidal and thus to allow a quick washing of it.

The product is then washed in suitable apparatus on the counter current principle in order to obtain a concentrated solution of ammonium sulphate.

If cadmium be present it can be precipitated by means of sulphureted hydrogen in a slightly acid solution.

In like manner nickel, cobalt and zinc if present can be precipitated by means of ammonium sulphide.

The ammonium sulphate solution is then crystallized to a marketable condition.

The iron hydrate after the removal of the ammonium sulphate is then electrolyzed with an electrolyte of a strong solution of sodium hydrate or caustic in an electrolytic cell for producing of electrolytic iron and oxygen in the main accordance with the U. S. Letters Patent 1,275,161.

The presence of nickel and cobalt in the hydrate will not affect the production of pure electrolytic iron in the cell but the electrolyte will become enriched and the periodical separation of the nickel and cobalt hydrates will be necessary.

The oxygen may be recovered for commercial use or may be used for the regeneration of nitric acid to be referred to here below.

Returning to the residue of the concentrates after the leaching with sulphuric acid. This is placed in special closed vats and leached with nitric acid preferably at a high temperature and eventually in combination with hydrochloric acid.

In this manner the sulphides will be converted into sulphur and nitrates, sulphates and chlorides of the metals.

The metallic salts thus produced being readily soluble in water may be separated leaving only a residue of sulphate of lead and sulphur.

This residue is leached with a strong solution of ammonium sulphate or acetate and the lead is finally precipitated by sulphureted hydrogen in the form of lead sulphide, the leaching-solution being repeatedly used.

The nitrous vapours given off from the leaching with nitric acid and those resulting from the treatment of the salts with hot sulphuric acid, when combined with the necessary quantity of water and oxygen obtained from the electrolytic cell as above set forth, provide for the regeneration of nitric acid.

The hydrochloric acid resulting from the treatment of the salts with the hot sulphuric acid will at the same time be regenerated.

It is preferable to carry out the regeneration in two absorption towers one for the absorption of the nitrous vapours and the hydrochloric acid and the other for the absorption of the oxygen by solution saturated with nitrous gases in the other tower.

Where gold or silver is contained in the residues the usual methods of extraction will be employed.

The invention is particularly valuable where cheap electrical power is obtainable. This is also a condition necessary for the cheap production of ammonia from atmospheric nitrogen.

The process is valuable in avoiding the use of roasting which so frequently results in the formation of ferrites with their objectionable characteristics.

What I claim is:—

1. A metallurgical process comprising treating sulphide iron ores containing other valuable metals with nonoxidizing heat, cooling and comminuting the ore, concentrating the same, leaching with dilute sulphuric acid, removing the copper from the solution produced, crystallizing the sulphate of iron, treating the crystallized mass with ammonia vapour and air, drying the product, washing out and discharging the ammonium sulphate from other metals and crystallizing the same.

2. A metallurgical process comprising treating sulphide iron ores containing other valuable metals with nonoxidizing heat, whereby the excess of sulphur is removed, cooling and comminuting the ore, concentrating the same, leaching with dilute sulphuric acid, using the evaporated sulphureted hydrogen in conjunction with the removed excess of sulphur for the production of the sulphuric acid, removing the copper from the solution produced, crystallizing the sulphate of iron, treating the crystallized mass with ammonia vapour and air, drying the product, washing out the ammonium sulphate and electrolyzing the iron hydrate in a cell with an electrolyte of a strong solution of sodium hydrate.

3. A metallurgical process comprising treating sulphide iron ores containing other valuable metals with nonoxidizing heat, cooling and comminuting the ore, concentrating the same, leaching with dilute sulphuric acid, crystallizing the sulphate of iron, treating the crystallized mass with ammonia vapour and air, drying the product, washing out the ammonium sulphate, electrolyzing the iron hydrate in an electrolytic cell, leaching the residue from the first leaching with nitric and hydrochloric acids at a high temperature, separating the solution of the metallic salts from the residue of sulphate of lead and sulphur and recovering the metallic salts of the solution.

4. A metallurgical process comprising treating sulphide iron ores containing other valuable metals with nonoxidizing heat, cooling and comminuting the ore, concentrating the same, leaching with dilute sulphuric acid, crystallizing the sulphate of iron, treating the crystallized mass with ammonia vapour and air, drying the product, washing out the ammonium sulphate, electrolyzing the iron hydrate in an electrolytic cell, removing the electrolyte periodically and extracting the nickel and cobalt.

5. A metallurgical process for treating sulphide iron ores containing other valuable metals from which the iron sulphide has been removed comprising leaching in a closed vessel with heat by means of nitric and hydrochloric acids, treating the residue with strong ammonium sulphate or acetate and precipitating the lead with sulphureted hydrogen and treating the solution from the leach with hot sulphuric acid to convert the metallic salts into sulphates.

6. A metallurgical process for treating sulphide iron ores containing other valuable metals from which the iron sulphide has been removed comprising leaching in a closed vessel with heat by means of nitric and hydrochloric acids, treating the solution with hot sulphuric acid, drawing off the hydrochloric and the nitrous vapours, adding water and oxygen from the cell to regenerate the hydrochloric and nitric acids, leaving the remaining metals in solution as sulphates.

7. A metallurgical process comprising treating sulphide iron ores containing other valuable metals from which the excess of sulphur has been removed in a closed leaching vessel with dilute sulphuric acid and with heat, withdrawing the sulphureted hydrogen gas produced, removing the solution and crystallizing the sulphate of iron therein, exposing the crystallized mass to the action of a mixture of ammonia vapour and air, washing out the ammonium sulphate and precipitating the metals in the ammonium sulphate solution with sulphureted hydrogen and ammonia and treating the iron hydrate in an electrolytic cell containing a strong solution of sodium hydrate, depositing the iron and withdrawing the oxygen from the cell, removing the electrolyte periodically and extracting the nickel and the cobalt of the same.

May 9th, 1925. Hagen in Westphalia.

AXEL TEODOR KONSTANTIN ESTELLE.